Sept. 11, 1934.　　　　R. F. PEO　　　　1,972,900
HYDRAULIC SHOCK ABSORBER
Filed Feb. 6, 1933　　　2 Sheets-Sheet 1
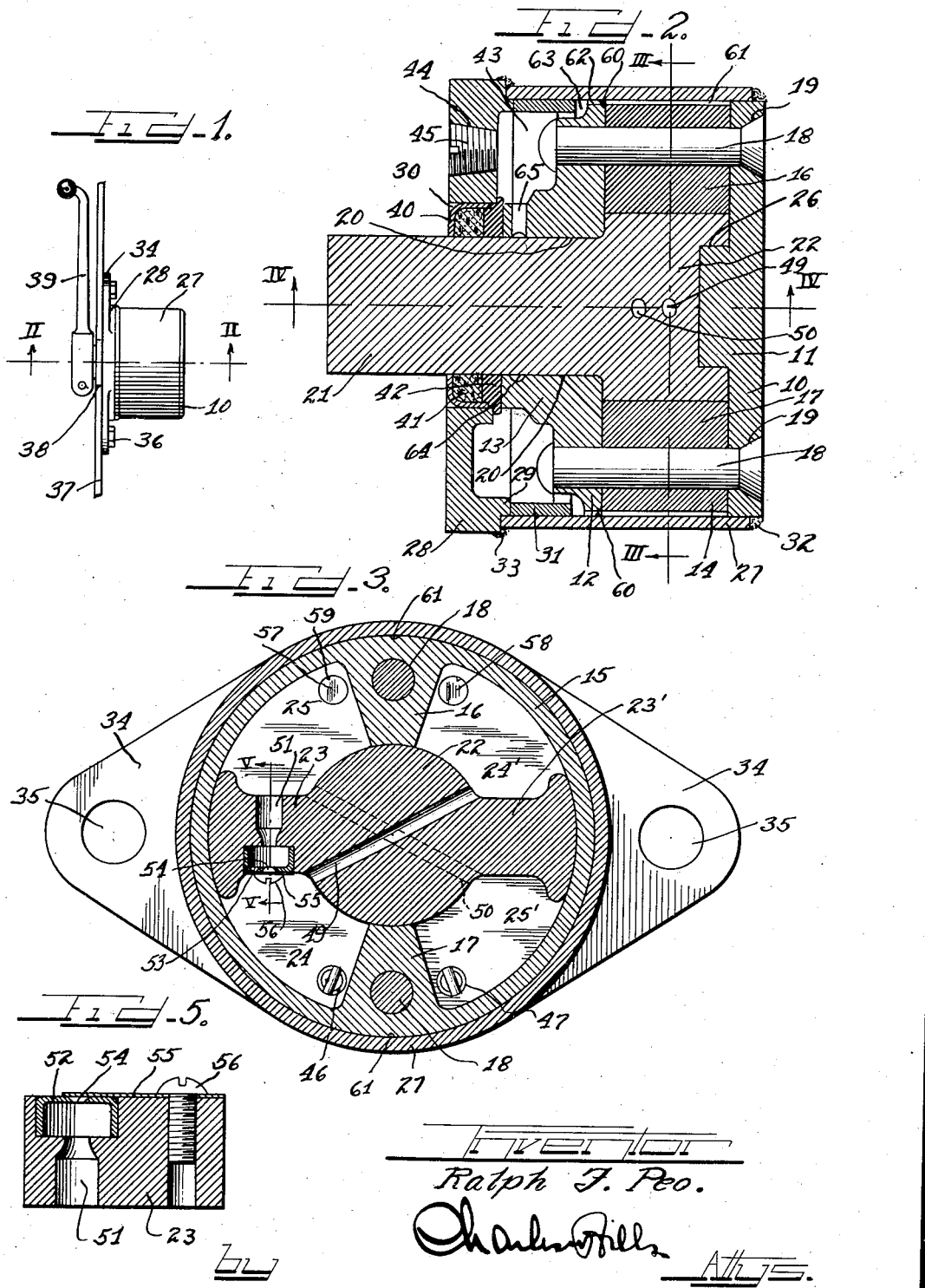

Sept. 11, 1934. R. F. PEO 1,972,900
HYDRAULIC SHOCK ABSORBER
Filed Feb. 6, 1933 2 Sheets-Sheet 2
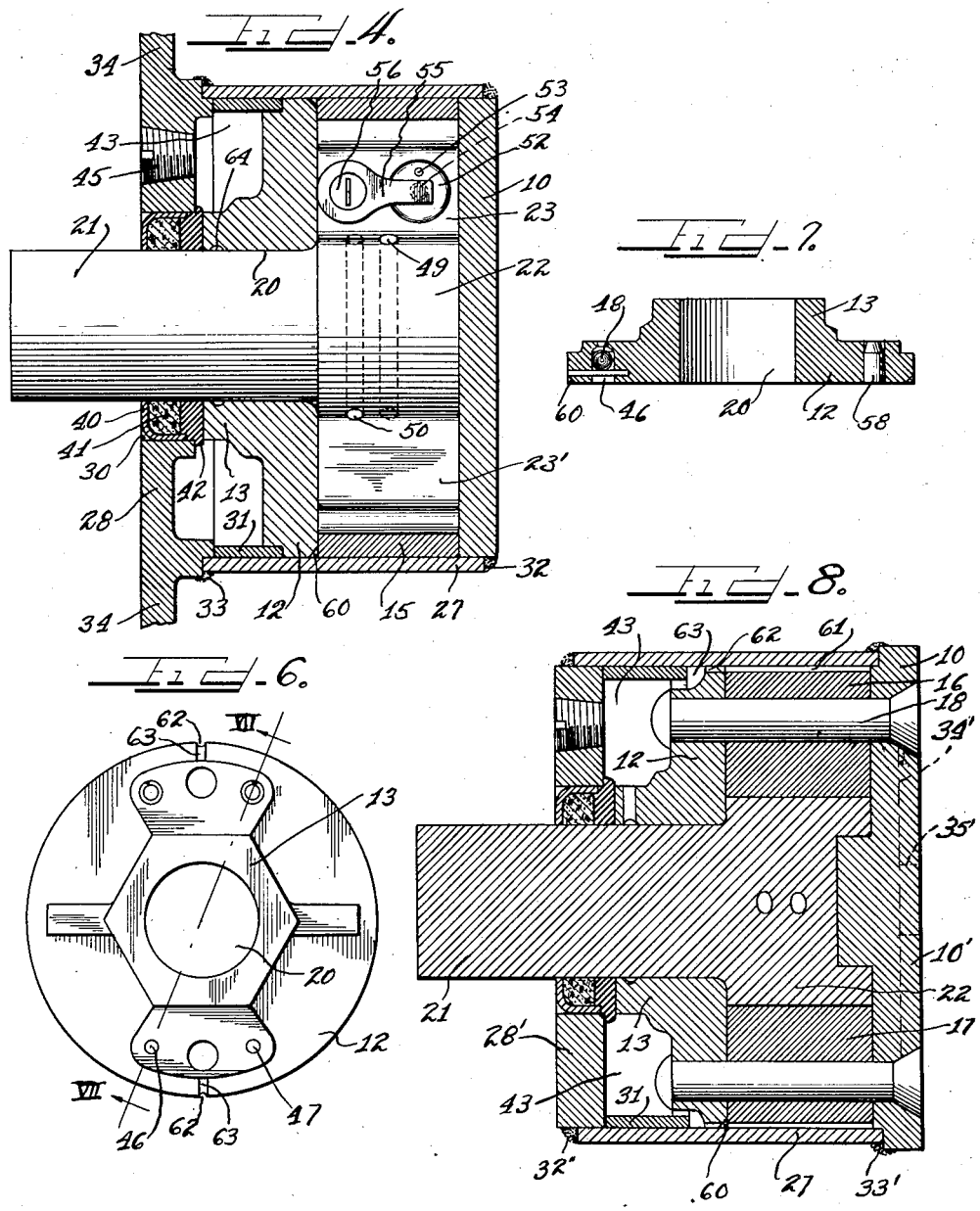
Inventor
Ralph F. Peo.

Patented Sept. 11, 1934

1,972,900

UNITED STATES PATENT OFFICE 1,972,900

HYDRAULIC SHOCK ABSORBER

Ralph F. Peo, Buffalo, N. Y., assignor to Houde Engineering Corporation, Buffalo, N. Y., a corporation of New York Application February 6, 1933, Serial No. 655,305

11 Claims. (Cl. 188—89)

This invention relates to hydraulic shock absorbers adapted particularly for use on pleasure automotive vehicles, the general object of the invention being to produce a compact structure comprising comparatively few parts which can be economically manufactured and assembled, and a structure in which the operating elements are securely confined within and protected by strong parts of steel securely welded together.

More in detail, an important object is to produce a structure in which parts directly forming the working chambers are normally and rigidly secured together for accurate operation of the moving elements, and in which an outer enclosing frame assists in holding the working chamber forming parts together and which casing also provides a replenishing chamber.

Another object is to make the outer enclosing housing of strong parts in the form of steel plates, stampings or forgings or of stock steel material.

Still another object is to secure these housing parts together by means of welding so as to eliminate any joints, such as threading, through which there might be leakage of hydraulic fluid under the heavy pressures to which the fluid will be subjected during service of the shock absorber.

The invention also includes other features of construction, arrangement and assembly, all such features being shown incorporated in the structure disclosed on the accompanying drawings, in which drawings Figure 1 is a plan view of a shock absorber mounted on an automobile chassis frame;

Figure 2 is an enlarged section on plane II—II of Figure 1;

Figure 3 is a section on plane III—III of Figure 2;

Figure 4 is a section on plane IV—IV of Figure 2;

Figure 5 is an enlarged section on plane V—V of Figure 3;

Figure 6 is a plan view, to reduced scale, of the parts forming the inner wall of the working chambers;

Figure 7 is a section on plane VII—VII of Figure 6; and

Figure 8 is a section similar to Figure 2 showing a modified arrangement.

Referring to Figures 1 to 7, the structure shown comprises an outer wall or disc 10 having the centering lug 11 on its inner side and this wall may be in the form of a steel stamping or forging. An inner circular wall 12 has the rearwardly extending flange 13 thereon and this wall may be in the form of a steel casting. Between the walls 10 and 12 is interposed the partition structure 14 which may be in the form of a steel casting and which comprises the cylindrical ring 15 having the partition lugs 16 and 17 extending radially inwardly from opposite sides thereof. The walls 10 and 12 and the partition structure are rigidly secured concentrically together by means of rivets 18 extending through the walls and the partition lugs 16 and 17, the heads of the rivets abutting against the wall 12 and the ends of the rivets extending through the countersunk opening 19 in the wall 10.

Extending through the bearing opening 20 through the wall 12 and its flange 13 is the shaft 21 which terminates in a cylindrical hub 22 abutting axially against the walls 10 and 12 and engaging at its circumference against the inner faces of the partition lugs 16 and 17. Extending in diametrally opposite directions from the hub are the wings or vanes 23 and 23' whose outer faces are of cylindric surface for engaging the cylindrical inner face of the ring 15 of the partition structure, the partitions 16 and 17 and the vanes 23 and 23' defining with the walls 10 and 12 and the ring structure 14 the high pressure working chambers 24 and 24' and the low pressure chambers 25 and 25'.

Before the walls 10 and 12 and the partition structure are secured together by the rivets, the vane structure is inserted and then the ends of the rivets are upset into the countersunk opening 19. While the rivets are thus being upset, the walls are securely held axially together and preferably the rivets are included between the terminals of a welding machine so that they will be welded to the parts through which they pass so that these parts will be securely and rigidly held together to accurately hold the vane or piston structure in proper alignment and in intimate engagement with the various bearing surfaces.

The shaft 21 with its hub and piston vanes may be in the form of a steel casting but is preferably a die forging as the structure must resist severe strains during operation of the shock absorber. In its outer end the hub has the cylindrical bearing recess 26 which receives the bearing and centering lug 11 on the outer wall 10.

To strengthen and to protect the pressure chamber forming parts 10, 12 and 14, a circumferential housing part in the form of a length 27 of steel tubing is slipped over the parts to engage with the circumferential surfaces thereof, and seating against the outer end of this tubular housing part is the base wall 28 having the annular flange 29 extending a distance into the tube wall. The wall 28 has the cylindrical passageway 30 for the shaft 21 and between the flange 29 of the wall and the wall 12 a spacer ring 31 is interposed which engages with the cylindrical inner face of the tube wall, and abuts with its edges against the walls 28 and 12 respectively. After the tube wall 27, the spacer ring 31 and the base wall 28 are assembled axial pressure is exerted by clamps engaging the outer wall 10 and the base wall 28 so that the spacer ring 31 is abutted securely against the wall 12, and then, preferably by means of arc welding, the tube wall 27, at its outer end, is welded or fused to the wall 10, as indicated at 32, and at its inner end, the tube wall 27 is fused or welded to the base wall 28, as indicated at 33, so that after release of the clamping pressure the spacer ring 31 will be rigidly held in place to assist the rivets 18 in holding the walls 10 and 12 against separation under the heavy pressure to which they will be subjected during operation of the shock absorber. After the welding operation the welded joint may be ground and smoothed down to form a finished appearance.

In the structure of Figures 1 to 4 the base wall 28 has the ears 34 extending laterally therefrom and provided with bolt holes 35 whereby the base wall 28 and the shock absorber structure may be secured, as by bolts 36, against the side of a vehicle chassis beam indicated by 37, the beam having an opening 38 therethrough for passage of the piston shaft 21 to whose end is secured an arm or lever 39 whose end is connected, usually by a drag link, with the vehicle axle.

The opening 30 in the wall 28 through which the shaft 21 extends is of larger diameter than the shaft to leave an annular packing pocket in which is placed a sheet metal retainer 40 of L-shape cross-section between whose axial flange and the shaft packing material 41, preferably cork, is interposed, and between whose inner end and the outer end of the flange 13 of wall 12 is interposed a packing ring 42 preferably of rubber. The retainer 40 has friction fit in the opening 30 and is forced inwardly under pressure to compress the cork packing and the rubber packing ring, the rubber packing, when subjected to pressure, extruding radially to extend between the ends of the flange 13 and the inner face of the wall 28 around the opening 30, thus forming an effective seal.

The space between the base wall 28 and the wall 12 provides an annular replenishing chamber 43 from which leakage is prevented by the packing structure 40, 41 and 42. In the base 28 at the top thereof is provided the filler opening 44 normally closed by a plug 45, and through this opening hydraulic fluid is poured into the replenishing chamber. At its bottom, this replenishing chamber is connected by passages 46 and 47 to the lower corners of the high and low pressure chambers 24 and 25' respectively, each of these passages being controlled by a check valve such as a ball 48 which permits flow from the replenishing chamber to the working chamber but prevents flow in the opposite direction. The high pressure chambers 24—24' are always in communication through a passageway 49 extending diametrally through the hub 22 of the shaft 21, while the low pressure chambers 25—25' are always in communication through a similar passageway 50 through the hub so that the hydraulic fluid entering through the passageways 46 and 47 may fill the various working chambers.

Suitable valving mechanism may be provided for controlling the bypassage of fluid between the high pressure and low pressure chambers and thereby control the shock absorber resistance as the piston structure is oscillated during travel of the vehicle. The valving arrangement shown is that disclosed in my copending application Serial No. 650,275, filed January 5, 1933. The arrangement shown includes a bypassageway 51 thru one of the vanes of the piston structure, the passageway being shown through the vane 23 between the high and low pressure chambers 24 and 25. At the high pressure end of the passageway a disc 52 is inserted which is provided with a knife-edge orifice 53 through which the flow is practically uninfluenced by variations in the viscosity in the fluid. The size of this orifice is calibrated so that the orifice interposes the desired resistance to the flow of the hydraulic fluid under the high pressure or rebound movement of the piston structure, such movement being in counterclockwise direction, Figure 3. To permit easier flow during the low pressure stroke of the piston, that is when the vehicle frame and axle move toward each other, a larger orifice or port 54 is provided in the disc 52. A flap valve 55 secured by a screw 56 engaged with its end over this large orifice and is held by the pressure during the rebound stroke to close this orfice so that during such stroke flow can be only through the smaller orifice 53. During the low pressure stroke the pressure will open the valve so that flow can be both through the exposed port 54 and the orifice 53.

The working chambers will always be kept filled with fluid, which, as before stated, flows in through the check valve controlled passageways 46 and 47. At the upper ends of the chambers 25 and 24' vent plugs 57 and 58 extend through openings in the wall 12, each plug having a restricted passageway therethrough which may be in the form of a notch or slit 59, and through these restricted vent passageways any air or gases collected at the top of the working chambers, or surplus oil, may flow to the replenishing chamber, these restricted passages being at all times filled with fluid so as to seal them against return of air or gas to the working chambers.

The inner peripheral edge of the wall 12 may be chamfered so as to leave an annular recuperating channel 60 between the wall 12 and the partition frame 14 and at the top and at other points cross channels 61 are provided in the outer face of the partition structure 14 so that any fluid which may escape between the structure 14 and the walls engaged thereby will flow to the recuperating channel 60. At the top and at other points the wall 12 has cross notches or channels 62 through which the collected fluid may flow from the recuperating channel and back to the replenishing chamber 43. To clear the inner edge of the spacer ring 31 grooves 63 are formed in the outer corner of the wall 12 for conducting the fluid from the grooves 62 past the ring 31 and to the replenishing chamber.

The bearing flange 13 has the annular groove 64 surrounding the shaft which groove is connected by a duct 65 with the replenishing chamber so that any fluid that might leak out between the shaft and the bearing walls will be recuperated and returned to the replenishing chamber.

On the structure of Figure 8 we have substantially the same construction and arrangement as in Figures 1 to 4, except that ears 34' are formed on the wall 10' so that this wall will then form the base for seating and securing the shock absorber on the vehicle chassis. Also on this structure the tubular housing part 27 will be slipped past the outer wall 28' to abut against the base wall 10', this tubular part being fused or welded to the base 10' and the wall 28' as indicated at 32' and 33'.

I thus produce a compact shock absorber structure built up of strong parts readily and economically manufactured and assembled, and a steel enclosure for protecting the structure against injury and eliminating any leakage of fluid therefrom. I do not desire to be limited to the exact construction, arrangement and operation shown and described, as changes and modifications may be made without departing from the scope of the invention as defined in the appended claims.

I claim as follows:

1. In a hydraulic shock absorber, the combination of an annular wall, side walls concentric with said annular wall, rivets extending in axial direction through said side walls for clamping said walls against said annular wall to define a hydraulic fluid containing space, and a length of steel tubing intimately surrounding said walls to reinforce said annular wall against fluid pressure.

2. In a hydraulic shock absorber, the combination of two outer walls and an inner wall, a partition frame forming with said inner wall and one of said outer walls a fluid containing chamber, said inner wall and said other outer wall defining a replenishing chamber, and a length of steel tubing surrounding said walls and welded to said outer walls.

3. In a hydraulic shock absorber, the combination of two outer walls and an inner wall, an annular frame and means clamping said frame between said inner wall and one of said outer walls whereby to define a hydraulic fluid containing chamber, and a length of steel tubing intimately surrounding said intermediate wall and said annular wall and welded at its ends to said outer walls, said inner wall and said other outer wall defining a fluid replenishing chamber.

4. In a hydraulic shock absorber, the combination of two outer walls and an intermediate bearing wall, an annular frame having radial partitions interposed between said intermediate wall and one of said outer walls and rivets axially securing said walls together to enclose a fluid containing space, a shaft journaled in said bearing wall and extending outwardly through said other outer wall and a piston on the inner end of said shaft for operating in said fluid chamber between said partitions, a tubular metal shell intimately surrounding said bearing wall and said annular wall and welded at its ends to said outer walls, said bearing wall and said other outer wall and said shell defining a replenishing chamber.

5. In a hydraulic shock absorber, the combination of two end walls and an intermediate wall, an annular frame and rivets clamping said frame between one of said end walls and said intermediate wall to define a hydraulic fluid containing space, a length of steel tubing surrounding said intermediate wall and said annular wall and welded at its ends to said end walls, and a spacing member between and abutting said intermediate wall and said other end wall to assist said rivets in preventing axial separation of said end wall and said intermediate wall.

6. In a hydraulic shock absorber, the combination of an annular cylindrical wall having partition abutments extending radially inwardly, outer and inner side walls engaging said annular wall concentric therewith, rivets extending through said side walls and said partitions to secure said three walls rigidly together to define a hydraulic fluid containing space, a piston operable in said space between said partitions and having a shaft extending through and journaled in one of said side walls, an end wall having an opening receiving said shaft, a spacer ring interposed between said end wall and said shaft journaling side wall, and a steel tube surrounding said side and end walls and said spacing ring and welded at its ends to said end wall and the outer side wall to hold said spacing ring abutted against said shaft journaling wall whereby to assist said rivets in preventing axial displacement of said side walls, said end wall and said shaft journaling wall and said spacing ring defining a replenishing chamber.

7. In a hydraulic shock absorber, the combination of an annular cylindrical wall having partition abutments extending radially inwardly, outer and inner side walls engaging said annular wall concentric therewith, rivets extending through said side walls and said partitions to secure said three walls rigidly together to define a hydraulic fluid containing space, a piston operable in said space between said partitions and having a shaft extending through and journaled in one of said side walls, an end wall having an opening receiving said shaft, a spacer ring interposed between said end wall and said shaft journaling side wall, and a steel tube surrounding said side and end walls and said spacing ring and welded at its ends to said end wall and the outer side wall to hold said spacing ring abutted against said shaft journaling wall whereby to assist said rivets in preventing axial displacement of said side walls, said end wall and said shaft journaling wall and said spacing ring defining a replenishing chamber, and a packing structure supported by said end wall to surround said shaft and abutting said shaft journaling wall.

8. In a hydraulic shock absorber, the combination of an annular wall having a partition lug extending radially inwardly, an outer side wall and an inner side wall engaging said annular wall concentric therewith and rivets extending through said side walls to secure them rigidly to said annular wall to form therewith a hydraulic fluid containing space, a piston operable in said chamber and defining with said partition lug high pressure and low pressure chambers, a shaft extending from said piston and journaled in said inner side wall, an end wall adjacent to said inner side wall having a passageway through which said shaft extends, said end wall and said outer side wall being in the form of steel forgings, and a length of steel tubing intimately surrounding said walls and being welded to said end wall and said outer side wall to form therewith a protecting and reinforcing housing, said end wall being spaced from said inner side wall to leave a replenishing chamber, and connections between said replenishing chamber and said pressure chambers.

9. In a hydraulic shock absorber, the combination of an annular cylindrical wall, side walls concentric with said annular wall, rivets extending through said side walls to clamp them against the sides of said annular wall to form therewith a hydraulic fluid containing space, an end wall adjacent to one of said side walls and spaced away therefrom to define therewith a replenishing chamber, a length of steel tubing surrounding said end wall and welded thereto, and engaging said other side wall and welded thereto, said tube intimately surrounding said annular wall and the inner side wall, an annular recuperating channel between said annular wall and said inner side wall at the peripheries thereof, grooves in the outer face of said annular wall communicating with said recuperating channel, and ducts in said inner side wall connecting said channel with said replenishing chamber.

10. In a hydraulic shock absorber, the combination of an annular cylindrical wall having partition abutments extending radially inwardly, outer and inner side walls engaging said annular wall concentric therewith to define a hydraulic fluid containing space, a piston operable in said space between said partitions and having a shaft extending through and journaled in one of said side walls, an end wall having an opening receiving said shaft, a spacer ring interposed between said end wall and said shaft journalling side wall, and a length of steel tubing surrounding said side and end walls and said spacing ring and welded at its end to said end wall and said outer side wall to hold said spacing ring abutted against said shaft journalling wall whereby to prevent axial displacement of said side walls, said end wall and said shaft journalling wall and said spacer ring defining a replenishing chamber.

11. In a hydraulic shock absorber the combination of an annular cylindrical wall having partition abutments extending radially inwardly, outer and inner side walls concentric with said annular wall and engaging against the sides of said annular wall and said partition abutments, rivets extending through said side walls and said partitions to secure said three walls rigidly together to form a hydraulic fluid containing structure, a piston operable in the space between said partitions and having a shaft extending through and journalled in one of said side walls, an end wall having an opening receiving said shaft, and a length of steel tubing receiving said annular wall and said side walls and welded at its ends to the outer of said side walls and to said end wall, said inner side wall and said end wall and said tubing defining a replenishing chamber.

RALPH F. PEO.